(12) United States Patent
Worthington et al.

(10) Patent No.: US 8,627,205 B2
(45) Date of Patent: Jan. 7, 2014

(54) SYSTEM FOR MANAGING MULTI-MEDIA CONTENT ACROSS MULTIPLE SOFTWARE APPLICATIONS

(76) Inventors: Cristian Alfred Worthington, Vancouver (CA); Ping Chen, Mississauga (CA)

( * ) Notice: Subject to any disclaimer, the term of this patent is extended or adjusted under 35 U.S.C. 154(b) by 545 days.

(21) Appl. No.: 12/210,202

(22) Filed: Sep. 14, 2008

(65) Prior Publication Data
US 2009/0077469 A1    Mar. 19, 2009

Related U.S. Application Data

(60) Provisional application No. 60/972,335, filed on Sep. 14, 2007.

(51) Int. Cl.
*G06F 3/00* (2006.01)

(52) U.S. Cl.
USPC ............ 715/716; 715/727; 715/738; 715/781

(58) Field of Classification Search
USPC ............... 719/313–323, 328–329; 715/733
See application file for complete search history.

(56) References Cited

U.S. PATENT DOCUMENTS

| | | | | |
|---|---|---|---|---|
| 5,418,968 | A * | 5/1995 | Gobeli | 710/260 |
| 5,423,038 | A * | 6/1995 | Davis | 705/12 |
| 5,796,952 | A * | 8/1998 | Davis et al. | 709/224 |
| 5,813,007 | A | 9/1998 | Nielsen | |
| 5,999,912 | A * | 12/1999 | Wodarz et al. | 705/14.61 |
| 6,026,429 | A | 2/2000 | Jones et al. | |
| 6,091,414 | A * | 7/2000 | Kraft et al. | 715/807 |
| 6,175,862 | B1 | 1/2001 | Chen et al. | |
| 6,243,725 | B1 | 6/2001 | Hempleman et al. | |
| 6,248,946 | B1 | 6/2001 | Dwek | |
| 6,427,175 | B1 | 7/2002 | Khan et al. | |
| 6,763,345 | B1 | 7/2004 | Hempleman et al. | |
| 7,058,892 | B1 | 6/2006 | MacNaughton et al. | |
| 7,562,287 | B1 | 7/2009 | Goldstein et al. | |
| 7,593,868 | B2 | 9/2009 | Margiloff et al. | |
| 2001/0010046 | A1 * | 7/2001 | Muyres et al. | 705/52 |
| 2001/0018858 | A1 | 9/2001 | Dwek | |
| 2001/0047297 | A1 * | 11/2001 | Wen | 705/14 |
| 2001/0047384 | A1 * | 11/2001 | Croy | 709/203 |

(Continued)

FOREIGN PATENT DOCUMENTS

| | | | |
|---|---|---|---|
| CA | 2564735 | A1 | 11/2005 |
| WO | 2009055692 | A2 | 4/2009 |

OTHER PUBLICATIONS

How the Internet Works. Gralla, Preston. Que Publishing, Indianapolis, IN, 2001. ISBN 0-7897-2582-7. Chapters 1-4, 22, Glossary, Index, front and back matter included.

(Continued)

*Primary Examiner* — Tuyetlien Tran
*Assistant Examiner* — Abimbola Ayeni
(74) *Attorney, Agent, or Firm* — Bruce M. Green; Oyen Wiggs Green & Mutala LLP

(57) ABSTRACT

A system is provided to i) Allow a computer to access multiple streams of multi-media content, such as video, audio and RSS content; ii) put a "place holder" inside software applications into which the multi-media content can be directed; and iii) direct the multi-media content to any software application running in the foreground that contains a place holder.

10 Claims, 5 Drawing Sheets

(56) References Cited

U.S. PATENT DOCUMENTS

| | | | |
|---|---|---|---|
| 2002/0004839 A1* | 1/2002 | Wine et al. | 709/231 |
| 2002/0059094 A1* | 5/2002 | Hosea et al. | 705/10 |
| 2002/0091762 A1* | 7/2002 | Sohn et al. | 709/203 |
| 2003/0028505 A1* | 2/2003 | O'Rourke et al. | 707/1 |
| 2004/0049737 A1* | 3/2004 | Simon Hunt et al. | 715/513 |
| 2004/0141207 A1* | 7/2004 | Warmus et al. | 358/1.18 |
| 2004/0199603 A1* | 10/2004 | Tafla et al. | 709/217 |
| 2004/0205448 A1* | 10/2004 | Grefenstette et al. | 715/500 |
| 2004/0225647 A1* | 11/2004 | Connelly et al. | 707/3 |
| 2004/0268261 A1* | 12/2004 | Elliott et al. | 715/716 |
| 2004/0268262 A1* | 12/2004 | Gupta et al. | 715/718 |
| 2005/0078944 A1* | 4/2005 | Risan et al. | 386/94 |
| 2005/0188048 A1* | 8/2005 | Yuan et al. | 709/208 |
| 2006/0031419 A1* | 2/2006 | Huat | 709/219 |
| 2006/0112341 A1 | 5/2006 | Shafron | |
| 2006/0129937 A1 | 6/2006 | Shafron | |
| 2006/0161863 A1* | 7/2006 | Gallo | 715/810 |
| 2006/0190561 A1 | 8/2006 | Conboy et al. | |
| 2006/0230156 A1* | 10/2006 | Shappir et al. | 709/227 |
| 2006/0253794 A1 | 11/2006 | Wilson | |
| 2007/0033269 A1 | 2/2007 | Atkinson et al. | |
| 2007/0112627 A1 | 5/2007 | Jacobs et al. | |
| 2007/0168543 A1* | 7/2007 | Krikorian et al. | 709/231 |
| 2007/0198532 A1* | 8/2007 | Krikorian et al. | 707/10 |
| 2008/0028474 A1* | 1/2008 | Horne et al. | 726/27 |
| 2008/0109785 A1 | 5/2008 | Bailey | |
| 2008/0172608 A1* | 7/2008 | Patrawala et al. | 715/255 |
| 2008/0183534 A1 | 7/2008 | Joo | |
| 2008/0189659 A1* | 8/2008 | Krutzler | 715/838 |
| 2009/0077469 A1* | 3/2009 | Worthington et al. | 715/733 |
| 2009/0113301 A1* | 4/2009 | Fisher et al. | 715/716 |
| 2009/0132942 A1 | 5/2009 | Santoro et al. | |
| 2009/0164641 A1* | 6/2009 | Rogers et al. | 709/227 |
| 2009/0183080 A1* | 7/2009 | Thakkar et al. | 715/733 |
| 2009/0254529 A1 | 10/2009 | Goldentouch | |
| 2010/0185513 A1 | 7/2010 | Anderson et al. | |

OTHER PUBLICATIONS

"FTC Alert on InternetALERT". Kuchinskas, Susan. InternetNews.com, Sep. 3, 2003. Available from <www.internetnews.com/ec-news/article.php/3403961>.

"Five Major Categories of Spyware". Barrett, Robertson. ConsumerReports Webwatch, Oct. 21, 2002. Available from <http://www.consumerwebwatch.org/dynamic/privacy-investigations-categories-spy.cfm>.

Internet Archive Wayback Machine, archive of "Common Gateway Interface". Archived at <http://web.archive.org/web/20010410030952/hoohoo.ncsa.uiuc.edu/cgi/intro.html>. Archived Apr. 10, 2001.

"Bibirmer Extension for Firefox, Internet Explorer". Available from <http://www.bibirmer.com/Extension/>.

* cited by examiner

FIG. 1 – Tile Manager Media Handling

FIG. 2 – Tile Manager Registration Protocol

FIG. 3 - Tile Manager Directs Media Object

SYSTEM FOR MANAGING MULTI-MEDIA CONTENT ACROSS MULTIPLE SOFTWARE APPLICATIONS

CROSS REFERENCE TO RELATED APPLICATION

The present application claims the benefits, under 35 U.S.C. §119(e), of U.S. Provisional Application Ser. No. 60/972,335 filed Sep. 14, 2007 which is incorporated herein by this reference.

TECHNICAL FIELD

The invention relates to the field of graphic user interfaces and to computer programs and audio and video interfaces for computer systems.

BACKGROUND

As a user moves from one software (e.g. Microsoft Word) application (e.g. Microsoft Word™) to another (e.g. Firefox™), the user leaves the functionality of the first application behind. For example, when a user "exits" or "minimizes" Microsoft Word and enters Firefox, the features in Microsoft Word are no longer available in Firefox.

The lack of continuity between applications is generally not a problem with conventional software, as most software functionality centers on the specific application. For example, a "Draw" function in Microsoft Word is not likely to be useful to a user engaged in browsing the web using Firefox. Therefore a user moving from Microsoft Word to Firefox does not experience a meaningful lack of functionality when he/she no longer has access to the functions that were present in Microsoft Word.

Multi-Media functions, such as Video, Radio, RSS and Flash present a unique challenge, particularly if these multi-media functions are embedded in software applications. If multi-media functions are embedded in software applications such as Microsoft Word or Excel™ or Thunderbird™, the user will experience a loss of continuity if the content does not "follow" the user as he/she moves from one software application to another. For example, a user watching a Video embedded in a session of Microsoft Excel may wish to continue watching the show as he/she opens a session of Thunderbird.

Presently, "media players", such as Windows Media Player™, Apple Quick Time™ and others play a session of content inside a single session of the media player software. This leads to two challenges for the user:
1. Unless the media player is in the foreground, the user will not be able to see the content being played. This limits the user, by preventing the user from launching any software applications that would overlay the media player.
2. If the user launches another session of a media player and requests the same content that was being watched in the previous session, the content will not start playing at the precise point that the previous sessions was playing. In effect, a second session of the media player will cause a completely new session of the same video that is not coordinated with the video that was being watched in the first session.

These problems become increasingly acute as the user opens subsequent software applications and wishes to continue watching the same multi-media content.

In the current state of the art, a user wishing to view the same video as he/she moves between software applications must be resigned to having a single media player permanently in the foreground. This presents two negative consequences:
a) If a software application has been selected that also needs to occupy the same area of the screen, the media player will over-write this area of the screen, obscuring the application beneath.
b) If the user elects to run the media player on part of the screen that is not used by the other software applications, the user will be left with a substantially smaller area of the screen in which to run other applications.

Additionally, media players:
1. Do not allow the user to control settings, such as the volume, if the media player is not running as the foreground application.
2. Do not allow the user to run multiple media sessions, such as multiple video sessions, at the same time.

What is needed is a Software System that will coordinate multiple media sources and display the content across multiple software sessions seamlessly, as the user moves between software applications. In addition, the Software System should offer the user the ability to control the settings of the media, e.g. volume and channel, in all of the software applications supported by the Software System.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention, hereafter referred to as a "Tile Manager", solves the foregoing problems by providing a system that will:
i) Allow a computer to access multiple streams of multi-media content, e.g. video, audio and RSS content.
ii) Put a "place holder" inside software applications into which the multi-media content can be directed.
iii) Direct the multi-media content to any software application running in the foreground that contains a place holder.

The present invention allows the user to control the streams of multi-media content by:
i) Allowing the user to control the audio volume emitted by the media.
ii) Allowing the user to add or subtract media sources.
iii) Allowing the user to change the channels of media being projected onto the place holder.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

In drawings which illustrate a preferred embodiment of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Description

The system is comprised of three principal software components:
1. Tile Manager—A software program that runs in the background, accesses the media sources, compiles the media into a single "Media Object" and directs the "Media Object" to the foreground application containing a "Place Holder". The Tile Manager is also referred to herein as the "system manager".
2. Place Holder—A Tool Bar contained within applications that are registered with the Tile Manager. The Place Holder is a software program capable of communicating with the Tile Manager and displaying the media content delivered by the Tile Manager.
3. Software Application—Any software application, e.g. Microsoft Word or Firefox, that is registered with the Tile Manager and contains a Place Holder. Software Applications other than the Tile Manager are referred to herein as "third-party software applications".

Tile Manager Media Handling

Figure 1:
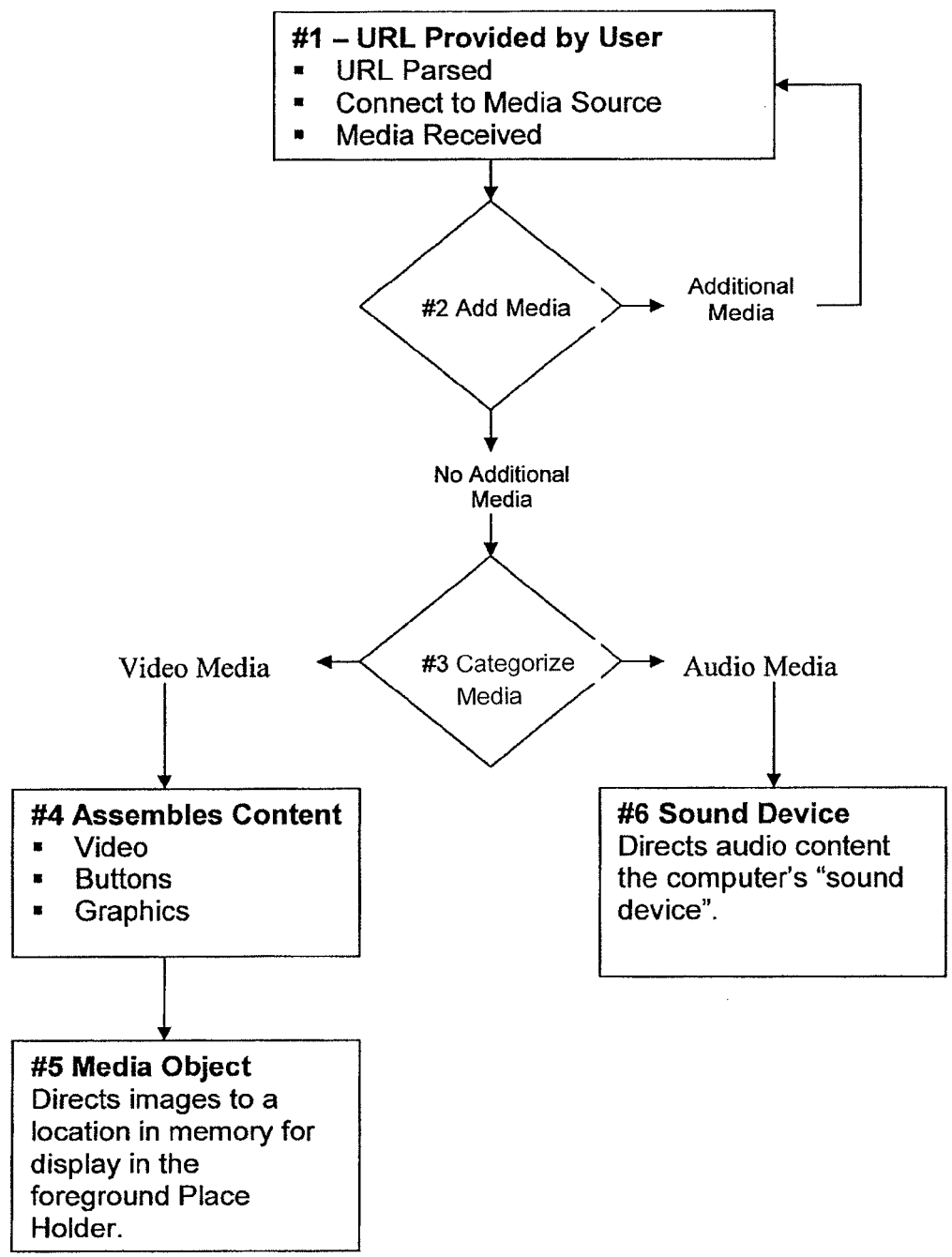
FIG. 1 is a flowchart illustrating the Tile Manager Media Handling

With reference to FIG. 1, the Tile Manager is a software program that functions in the following manner:
1. When the URL of a website containing media, such as video, is provided to the Tile Manager, a software module controls the parsing of the URL, communicates with the media source and receives the media into memory.
2. The Tile Manager can be executed repeatedly with different URL's to generate multiple streams of media content.
3. When the user adds a new media URL, the media content is treated differently if Media is in Video or Audio format.
4. Video media is played in the background and is packaged to create a "Media Object" which is displayed to the user. The Media Object is produced in the following manner:

The elements of the Media Object are assembled into a single image. The elements include:
  i. Video content (whether in "streaming" video, "Flash" video, or another format).
  ii. Buttons and controls (such as Volume Controls and Channel Controls).
  iii. Art Work (frames and other graphical devices used to make the image look appealing to users).

The Tile Manager outputs the assembled content to a Media Object with the default background color for the application to which the content is directed.
  5. The Media Object is directed to the Place Holder resident in the foreground Software Application.
  6. Audio media is played in the background and is directed to the Sound Device. Controls for the Sound Device are contained within the Buttons in the Media Object.

Tile Manager Registration Protocol

Figure 2:
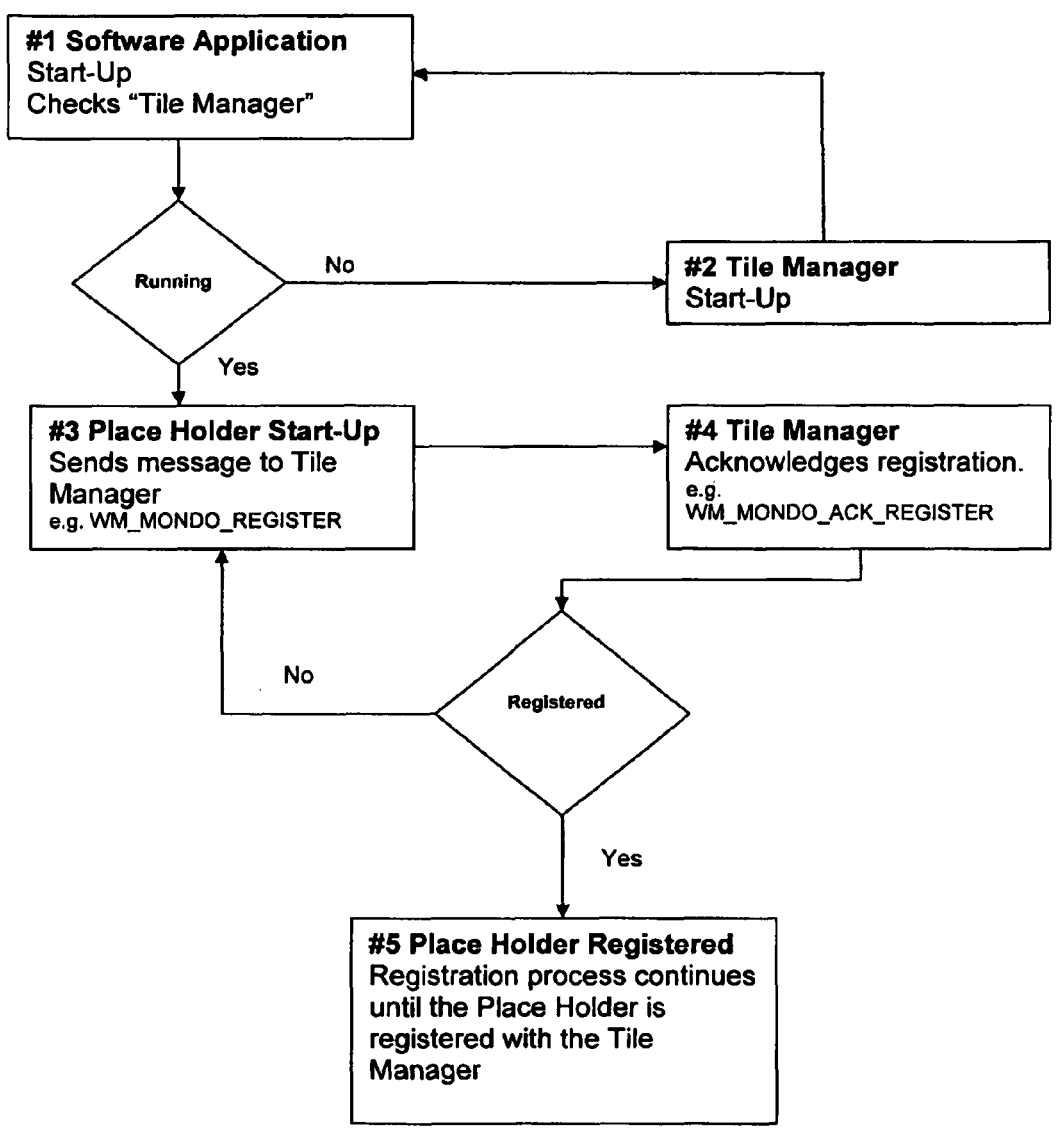
FIG. 2 is a flowchart illustrating the Tile Manager Registration Protocol.

With reference to FIG. 2, when a user starts a Software Application, e.g. Microsoft Outlook™, a registration protocol is initiated between the Place Holder embedded in the software application and the Tile Manager. This registration protocol ensures that the Tile Manager is aware of the execution of a Software Application equipped with a Place Holder.

The following is an example of a protocol:
1. When a Software Application containing the Place Holder starts up or during the execution of the software application, the Place Holder checks to see if the Tile Manager is running.
2. If the Tile Manager is not already running in the background, the Tile Manager is executed and runs in the background.
3. As the Software Application starts up or during the execution of the software application, the Place Holder sends a message to the Tile Manager to indicate that the application is running, e.g. WM_MONDO_REGISTER.
4. The Tile Manager responds with a message to the Place Holder to acknowledge receipt of the message, e.g. WM_MONDO_ACK_REGISTER.
5. If the Place Holder does not receive acknowledgment from the Tile Manager, e.g. WM_MONDO_ACK_REGISTER, it will continue to announce that it is running by sending a message e.g. WM_MONDO_REGISTER indicating it is running.

Tile Manager Directs Media Object

Figure 3:
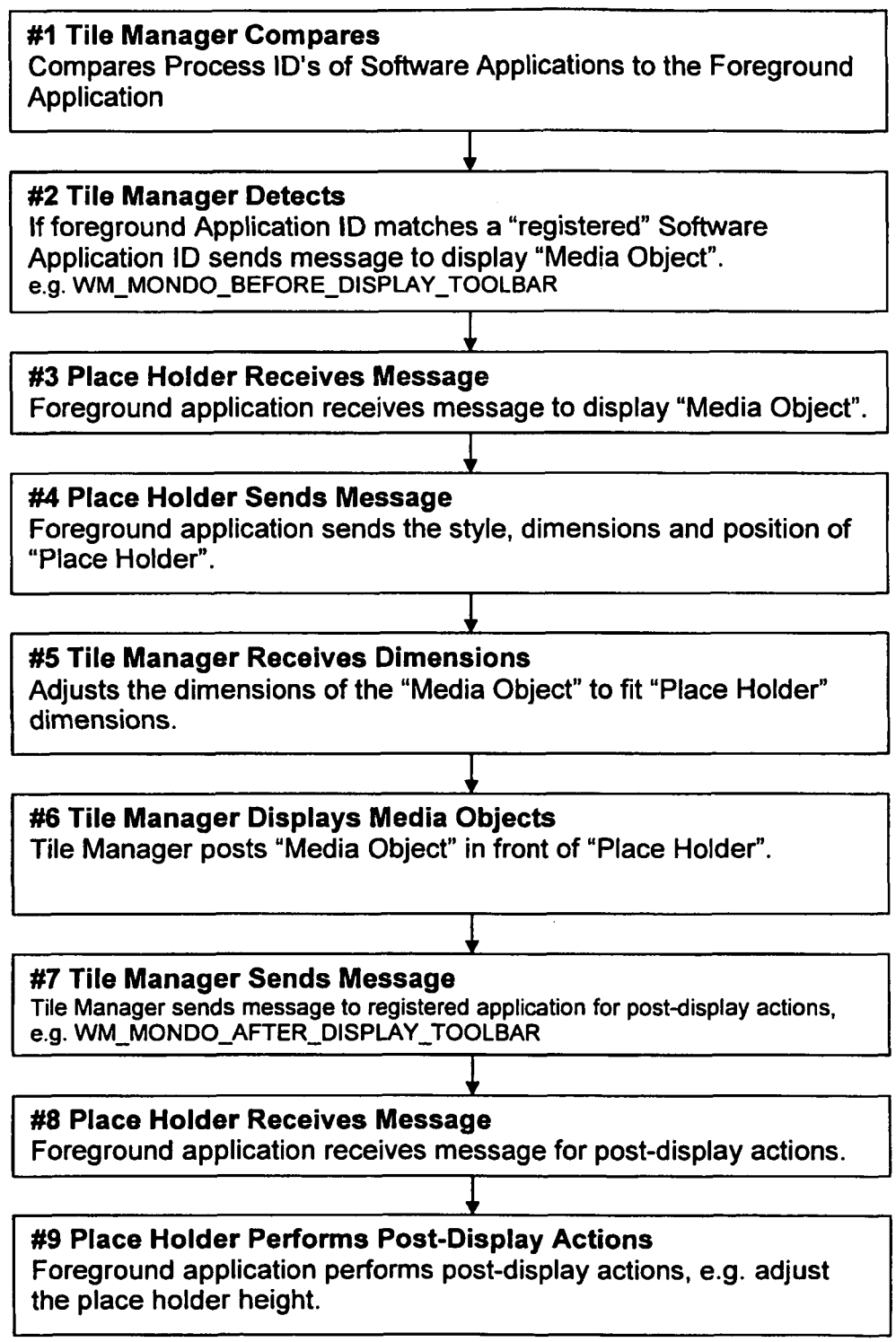
FIG. 3 is a flowchart illustrating how the Tile Manager directs media objects.

With reference to FIG. 3, the Tile Manager maintains a list of the Software Applications that are running and contain Place Holders. The Tile Manager uses the following process to direct the Media Object to the foreground Software Application:
1. The Tile Manager constantly compares the "Process ID" of each registered Software Application to the Process ID of the Foreground Application. (The "Foreground Application" is the Software Application that is running in the foreground and can be seen by the user.)
2. When the Tile Manager detects that a registered Software Application is running in the foreground, the Tile Manager sends a message to the Place Holder in the Foreground Application before it is ready to display the Media Object, e.g. WM_MONDO_BEFORE_DISPLAY_TOOLBAR.
3. The Place Holder in the Foreground Application receives the message indicating that the Tile Manager is ready to display the Media Object, e.g. WM_MONDO_BEFORE_DISPLAY_TOOLBAR.
4. The Place Holder in the Foreground Application sends a message using Shared Memory to the Tile Manager indicating the style, dimensions and position of the Place Holder.
5. The Tile Manager retrieves the style and width of the Place Holder and adjusts the size of its Media Object.
6. The Tile Manager displays the Media Object in the space allotted by the Place Holder.

7. The Tile Manager sends a message to the Place Holder in the Foreground Application for post-display actions with the actual height of the toolbar.
8. The Place Holder in the Foreground Application receives the message for post-display actions.
9. The Place Holder in the Foreground Application performs the post-display actions, e.g. adjust the height of the toolbar to match with the actual height of the Place Holder.

The Place Holder utilizes a Window Control provided by the manufacturer of a software application such as Microsoft Word. A Window Control is a commonly used method by which a software program can receive signals from another software application or process. For example, Microsoft Word provides a Window Control called a Tool Bar Control, which allows Microsoft Word to receive signals from another software application which are then interpreted in accordance with a preprogrammed set of instructions stored in a file called an Add-in Module. For example, the Place Holder in a Microsoft Word implementation is comprised of the following elements:

1. A Window Control that contains the instructions in an Add-in Module to "Register" Microsoft Word with the Tile Manager when Microsoft Word is executed, in accordance with the Registration process described above.
2. The means to output a "blank bitmap" with a light blue background color that matches the width, height and location parameters negotiated during the registration process.

Figure 4:
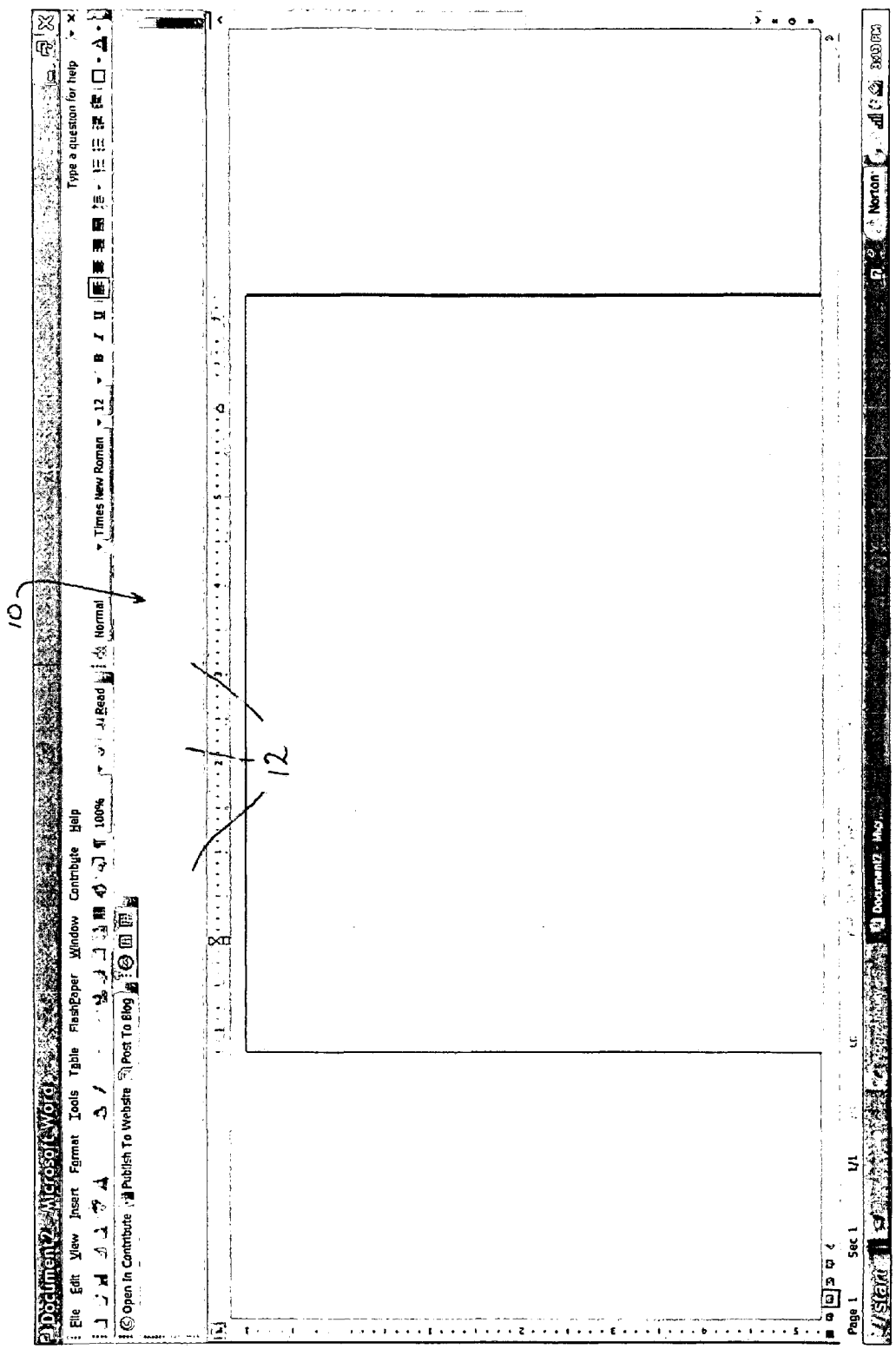
FIG. 4 is a screen shot illustrating a blank Place Holder.
Figure 5:
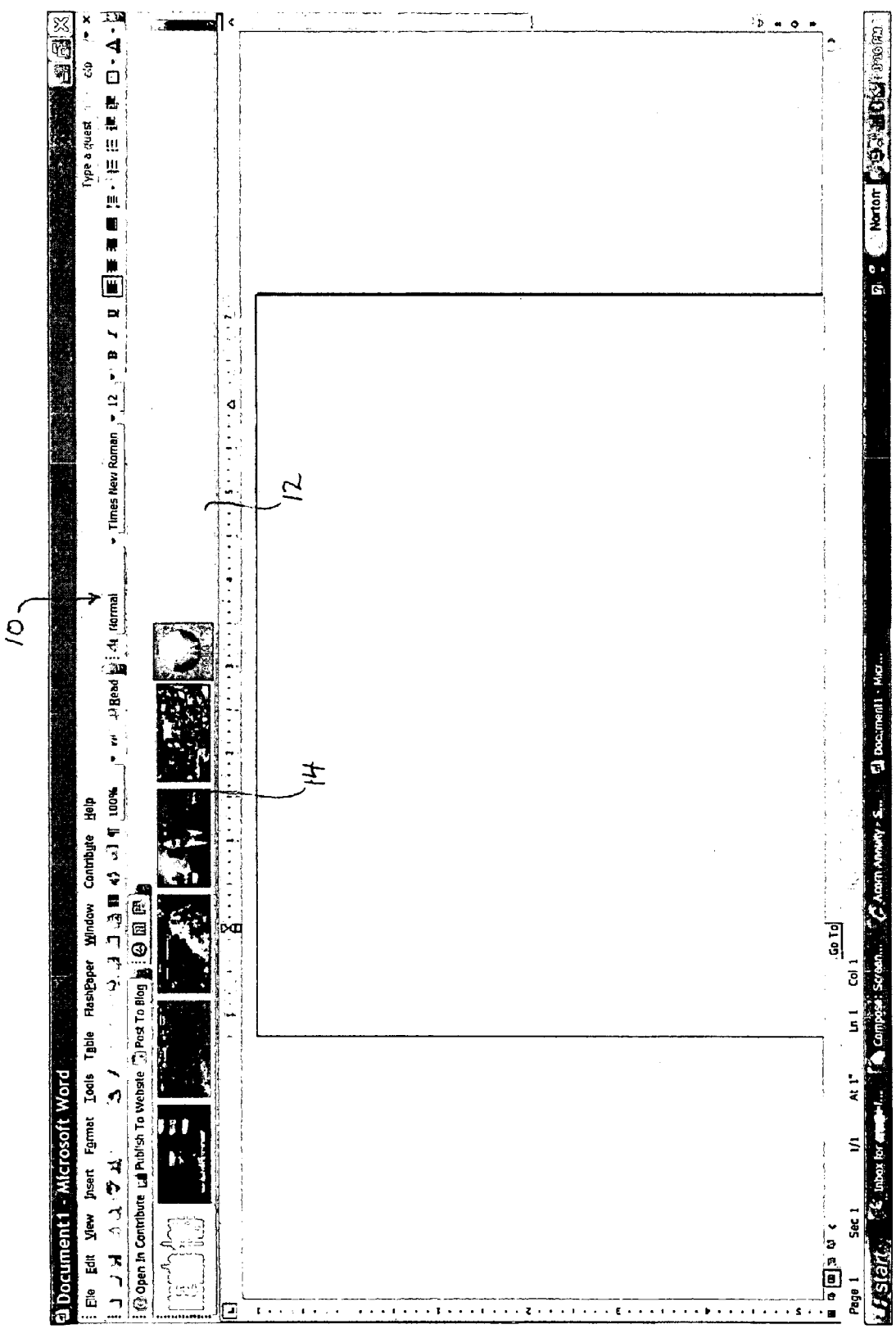
FIG. 5 is a is a screen shot illustrating a Place Holder displaying media content.

The Place Holder is essentially a "canvas" upon which the Tile Manager can "paint" the Media Object. Each software application development company publishes its own specifications for a Window Control although the term Window Control may differ in some applications. Most software applications allow for this type of simple "canvas" to be made available for the Tile Manager. FIGS. 4 and 5 illustrate screen shots of a Place Holder in a Microsoft Word implementation. FIG. 4 shows the screen display of the graphic user interface 10 for Microsoft Word in which the Place Holder 12 is displayed without Media Objects as a rectangular blank bitmap, in the light blue of the background color, having a pre-defined height and width. In FIG. 5 the size of the Place Holder 12 has been adjusted to display Media Objects 14 in accordance with the instructions from the Tile Manager.

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within its true spirit and scope.

What is claimed is:

1. A method of managing multi-media content across a plurality of software applications running on users' computers, each user's computer having a memory and a computer display able to provide a graphical user interface adapted to display a software application in a foreground window when said software application is selected to run in the foreground of said interface, said user's computer being accessible to multiple streams of multi-media content and comprising a system manager, the method comprising:
   i) providing in the toolbar of each said software application a place holder adapted to provide a space within the software application's foreground window for the display of said multiple streams of multi-media content by said system manager, said place holder comprising means to output a blank bitmap having pre-defined characteristics comprising background color, width, height and location;
   ii) registering said place holder for each said software application with the system manager;
   iii) compiling said multiple streams of multi-media content;
   iv) directing one or more of said compiled multiple streams of multi-media content to be simultaneously displayed over said placeholder within the software application's foreground window when each said software application is running in the foreground of said interface; and
   v) providing separate control of the sound volume for each simultaneously displayed stream of multi-media content;
wherein said place holder comprises a window control feature of a software application that contains instructions to register the software application with said system manager when the application is executed; and
wherein said directing step comprises:
   i) the system manager maintaining a list of the software applications that are running and contain place holders;
   ii) the system manager comparing the Process ID of each registered software application to the Process ID of the software application that is running in the foreground;
   iii) when the system manager detects that a registered software application is running in the foreground, the system manager sends a message to the place holder in the software application that is running in the foreground indicating that the system manager is ready to display the multi-media content;
   iv) the place holder in the software application that is running in the foreground receives the message;
   v) the place holder in the software application that is running in the foreground sends a message to the system manager indicating the characteristics of the place holder;
   vi) the system manager receives the characteristics of the place holder and adjusts the size of the multi-media content;
   vii) the system manager displays the multi-media content in the space provided by the place holder.

2. The method of claim 1 wherein said place holder is registered by initiating a registration protocol between the place holder and said system manager whereby said system manager is notified of any software application provided with a place holder which is running.

3. The method of claim 2 wherein said registration protocol step comprises:
   i) during the execution of the software application the place holder checks to see if the system manager is running;
   ii) if the system manager is not already running in the background, the system manager is executed and runs in the background;
   iii) during the execution of the software application, the place holder sends a message to the system manager to indicate that the application is running;
   iv) the system manager responds with a message to the place holder to acknowledge receipt of the message;
   v) if the place holder does not receive acknowledgment from the system manager it continues to announce that it is running by sending a message indicating it is running.

4. The method of claim 1 wherein said compiling step comprises:
   i) communicating with a source of multi-media content and receiving said streams of multi-media content into said computer's memory;

ii) separating multi-media content into video or audio format; and iii) assembling each said stream of video multi-media content into a single image file comprising: a) video content; b) buttons and controls; and c) graphic features to form a media object.

5. The method of claim 1 wherein said directing step comprises the further step of playing the related audio media in the background by means of a sound device.

6. The method of claim 1 wherein said directing step comprises the further steps of:

viii) the system manager sends a message to the place holder in the software application that is running in the foreground for post-display actions;

ix) the place holder in the software application that is running in the foreground receives the message for post-display actions; and x) the place holder in the software application that is running in the foreground performs the post-display actions.

7. The method of claim 6 wherein said post-display action is adjusting the height of a toolbar to match the actual height of the place holder.

8. The method of claim 1 wherein said multi-media content is selected from the group comprising video, audio and RSS content.

9. A non-transitory computer readable storage medium having program code stored thereon, wherein the program code, when executed by a computer, performs the method of claim 1.

10. A non-transitory computer readable storage medium having program code stored thereon, wherein the program code, when executed by a computer, performs the method of claim 3.

* * * * *